United States Patent [19]
Koberstein et al.

[11] Patent Number: 5,661,092
[45] Date of Patent: Aug. 26, 1997

[54] ULTRA THIN SILICON OXIDE AND METAL OXIDE FILMS AND A METHOD FOR THE PREPARATION THEREOF

[75] Inventors: Jeffrey T. Koberstein, Storrs; Christopher L. Mirley, Mansfield, both of Conn.

[73] Assignee: The University of Connecticut, Storrs, Conn.

[21] Appl. No.: 522,948

[22] Filed: Sep. 1, 1995

[51] Int. Cl.$^6$ ................................................. H01L 21/306
[52] U.S. Cl. ........................... 427/515; 427/226; 438/781; 438/789; 438/939
[58] Field of Search .................................... 437/235, 238; 427/228, 226, 515; 502/232

[56] References Cited

U.S. PATENT DOCUMENTS

| | | | |
|---|---|---|---|
| 4,028,080 | 6/1977 | Di Vita et al. | 65/425 |
| 4,028,135 | 6/1977 | Vig et al. | 134/1 |
| 4,273,851 | 6/1981 | Muzyczko et al. | 430/175 |
| 4,728,576 | 3/1988 | Gillberg-LaForce et al. | 428/411.1 |
| 4,753,855 | 6/1988 | Haluska et al. | 427/58 |
| 4,756,977 | 7/1988 | Haluska et al. | 427/228 |
| 4,808,653 | 2/1989 | Haluska et al. | 524/398 |
| 4,822,697 | 4/1989 | Haluska et al. | 427/74 |
| 5,082,686 | 1/1992 | Desorcie et al. | 427/515 |
| 5,091,162 | 2/1992 | Frye et al. | 423/325 |
| 5,130,162 | 7/1992 | Ogawa et al. | 427/515 |
| 5,318,857 | 6/1994 | Haluska | 427/126.3 |
| 5,331,020 | 7/1994 | Brown et al. | 427/515 |
| 5,336,532 | 8/1994 | Haluska et al. | 427/515 |
| 5,358,739 | 10/1994 | Baney et al. | 427/228 |
| 5,387,480 | 2/1995 | Haluska et al. | 427/228 |
| 5,387,546 | 2/1995 | Maeda et al. | 437/235 |
| 5,399,441 | 3/1995 | Bearinger et al. | 427/228 |

OTHER PUBLICATIONS

A. Klumpp et al., *Photoinduced Transformation of Polysiloxane Layers to SiO₂*, pp. 301–303, Applied Surface Science 43 (1989).

O. Joubert, *Ultraviolet induced transformation of polysiloxane films*, pp. 6647–6651 May 1, 1991; J. Applied Phys. 59 (9).

John R. Vig, *UV/Ozone Cleaning of Surfaces*, pp. 1–25; U.S. Army Electronics Technology & Devices Laboratory.

K. Fujino et al., *Low Temperature and Atmospheric Pressure CVD Polysiloxane, OMCTS, and Ozone*, J. Electrochem Soc. vol. 138, No. 12, Dec. 1991, pp. 3727–3732.

A. A. Kalachev et al., *Low temperature plasma treatment of monomolecular Langmuir–Blodgett films*, 1993, pp. 307–311; Thin Solid films 288.

M. D. Nyman et al, *T₈–Hydridospherosiloxanes: Novel Precursors for SiO₂ Thin Films. 1. precursor Characterization and Preliminary CVD*, Aug. 12, 1993, pp. 1636–1640.

Toshiro Maruyama et al., *Silicon dioxide thin films prepared by photochemical vapor deposition from silicon tetraacetate*, Apr. 19, 1993, pp. 201–203; Thin Solid films 232.

C. L. Mirley et al., *A Novel Method for the Preparation of Ultrathin Organoceramic Films From Langmuir–Blodgett Layers*, pp. 1–12; May 1995.

*Primary Examiner*—R. Bruce Breneman
*Attorney, Agent, or Firm*—Fishman, Dionne & Cantor

[57] ABSTRACT

Ultra thin organo-ceramic and metal oxide films are prepared under room temperature and atmospheric conditions by exposing α,ω-functional siloxane oligomers and fatty acid metal soaps, respectively, to a combination of ultraviolet light (UV) and ozone ($O_3$). The process includes the steps of preparing ultra thin α,ω-functional polysiloxane and fatty acid metal soap films using, but not limited to, the Langmuir-Blodgett (LB) technique. The LB technique permits construction of molecular monolayer or multilayer films on a variety of substrates. By using carboxylic acid end groups on the siloxane oligomers, metal ions can be incorporated into the SiOx film after UV-ozone exposure. This technique can be used to make electronically, optically, and chemically important organo-ceramic and metal oxide films on temperature sensitive substrates.

16 Claims, 4 Drawing Sheets

ULTRA THIN SILICON OXIDE AND METAL OXIDE FILMS AND A METHOD FOR THE PREPARATION THEREOF

BACKGROUND OF THE INVENTION

1. Field of the Invention

The invention relates to a method for producing a commercially valuable ultra thin silicon oxide, organic ceramic, or metal oxide films at room temperate and atmospheric pressure. More particularly, the invention relates to the production of such films by exposing $\alpha,\omega$-functional siloxane oligomers or fatty acid metal soaps to short wavelength UV light and ozone.

2. Prior Art

It is known, for example from Klumpp and Sigmund, *Photo induced Transformation of Polysiloxane layers to $SiO_2$*, Applied Surface Science 43 (1989) 301–303, to produce silicon oxide layers by treating a polysiloxane vapor deposited layer on a substrate with combined thermal and photolytic conditions. More particularly, a layer of $SiO_2$ is known to be produceable from the above stated overlayered substrate by subjecting the polysiloxane overlayer to heat in the range of 20°–400° C. for hydrolysis and 350°–800° C. for condensation. Therefore as a practical matter, the materials must be acted upon at a temperature from about 350° to about 400° C. which is expensive and, therefore, less commercially attractive than the present invention.

Another prior art method includes ultraviolet induced transformation of polysiloxane films. O. Joubert, et al in *Ultraviolet Induced Transformation of Polysiloxane Films* J. Appl. Phys. 69 (9), 1 May 1991 pg. 6647–6651 teach that > There are various groups of silicon based organic materials such as the polysiloxanes $[Si-O_x(C_nH_m)_y]$ and tetraethoxysilane $[Si(OC_2H_5)_4]$ which can be used as base materials from which amorphous $SiO_2$ (a-$SiO_2$) can be obtained by removal of the CH groups. Forming solutions of a polysiloxane or tetraethoxysilane in the appropriate solvents enables thin films of the materials to be deposited by standard spin-on technology as used for photosensitive resists deposition. The solvents may be removed from the spun films by subsequent heating in air at temperatures in the range from 150° to 250° C. Removal of the CH groups is usually achieved by heating of the dried film at higher temperatures in air or by heating to somewhat lower temperatures in an $O_2$ plasma. Both processes ensure the reoxidation of the film after CH group removal. Flowing of the remnant, porous films seals the voids and rebounds any dangling bonds left in the network after CH group removal. This process may be achieved by rapid thermal annealing to avoid extended high-temperature effects. Two problems are thus posed in transforming the silicate materials into a-$SiO_2$; removal of the CH groups and void sealing by flow of the network.

The transformation taught, however, requires high temperature and there is no teaching regarding ozone.

A further prior art teaching is from Furjino, et al. in *Low Temperature and Atmospheric Pressure CVD using Polysiloxane, OMCTS and Ozone*, J. Electrochemistry Society, Vol. 138 No. 12 (December 1991) pgs. 3727–3732. Fujino et al. teaches that silicon dioxide may be deposited on a substrate by using an organic silicon material, such as OMCTS and ozone at low temperature e.g., 400° C., and atmospheric pressure. Drawbacks of this method include cost associated with low temperature apparatus and an extended period of time required to produce the films. Other drawbacks include substrate depositing onto kept at 400° C. Must heat OMCTS to 80° C. prior to deposition.

Other techniques for preparing silicon oxide films ($SiO_x$) on various substrates include pyrolytic degradation or UV excimer laser irradiation of polydimethylsiloxanes, chemical and photochemical vapor deposition (which is a commercially available process), and spin casting of silica solutions. All of these techniques involve the use of high temperatures, i.e. 100°–800° C., to achieve a continuous silicon oxide coating. Also the thickness of these films cannot be made as thin as those prepared from polysiloxane Langmuir-Blodgett films.

SUMMARY OF THE INVENTION

The above-discussed and other drawbacks and deficiencies of the prior art are overcome or alleviated by the herein described means of producing $SiO_x$ films and the films produced thereby. The invention produces the commercially beneficial films from $\alpha,\omega$-functional siloxane oligomers and fatty-acid metal soaps, respectively, by employing ultraviolet light (UV) of short wavelength and ozone ($O_3$). Ozone may be supplied independently or created by the reaction of UV light with air nearby the light source.

While many different film types are applicable to the present invention, Langmuir-Blodgett (LB) films are presently preferred because the technique for preparing these films is well known and has been documented for at least 50 years. Moreover, the apparatus utilized to fabricate LB films is commercially available from a variety of vendors.

The combination of $\alpha,\omega$-functional polysiloxane LB films and UV-ozone produces continuous silicon oxide coatings that are composed of a 75% $SiO_2$ network. This mount of network formation at room temperature is significant for silicon oxide coatings prepared at room temperature.

Similarly, exposure of an LB film comprised of fatty acid metal soaps to UV-ozone forms continuous metal oxide films on various substrates. Other techniques for preparing these types of coatings include chemical and plasma-enhanced chemical vapor deposition methods which are commercially available processes. However, the film thicknesses attainable with these commercial techniques are not as thin as those possible using UV-ozone exposed LB films as taught in the present invention.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
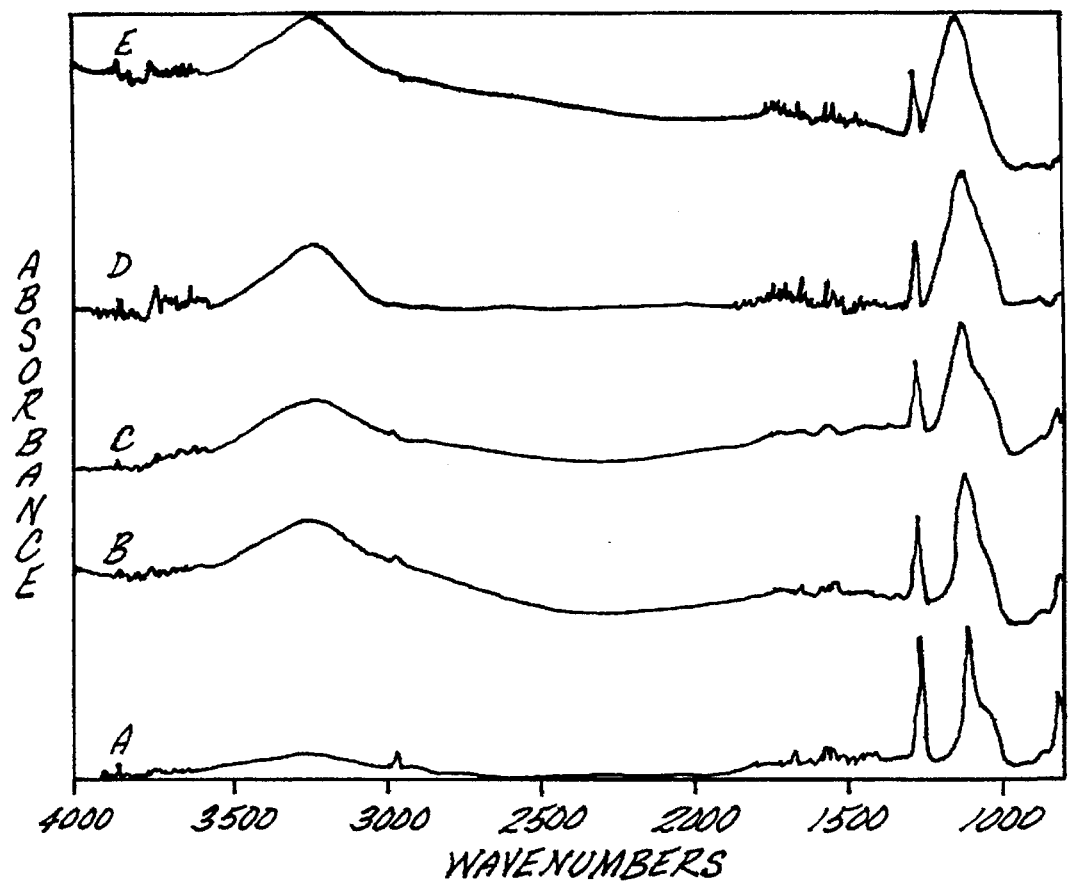
FIG. 1 is a grazing incidence reflection infrared spectra for diacPDMS (t=232 Å) on silver versus UV-ozone exposure time for A) 0 min B) 5 min C) 10 min D) 20 min and E) 30 min. Each spectrum is the average of 100 scans obtained at a reflection angle of 80°. The curves are vertically shifted for clarity.

The method of the invention converts preceramic materials to ultra thin film ceramic coatings primarily comprising silicon oxide ($SiO_x$) and fatty acid metal soaps to metal oxide films. More particularly, and referring to the first embodiment of the invention, pre-ceramic films preferably containing functionally terminated polysiloxane groups, and most preferably polydimethylsiloxane groups, are pre-coated in a thin film on a suitable substrate. The substrates preferred include silicon, gold or silver.

In general, preparation for the pre-ceramic film material is by the Langmuir-Blodgett (LB) film method or other method capable of producing sufficiently thin precursor films. The LB film process is employed in the examples of this invention principally due to the ready commercial availability of the apparatus therefor, the reliable repeatability of the resulting films and because the process has a substantial history (>50 years) making it very well known in the art. The LB process in this invention has been successfully employed to create films on the order of 2 nanometers in thickness. Films such as these provide for ultra thin $SiO_x$ films after conversion of the LB films by the process of the invention, which is very valuable commercially.

It should be noted that the process of the invention is also well suited to converting thin film fatty acid metal soaps to continuous metal oxide films. This aspect of the invention will be disclosed following the discussion of $SiO_x$ films.

Subsequent to coating of the substrate material with the thin film polydimethylsiloxane material the coated substrate is placed in an apparatus adapted to irradiate the subject material with UV light having wavelength peaks of preferably in the range of 185-254 nanometers (nm) since this energy level functions both to produce ozone from atmospheric oxygen and to excite organic molecules, an important aspect of the invention. Preferred UV sources include low pressure mercury quartz lamps which are readily commercially available from a variety of vendors, such as American Ultraviolet Co., Gaerotner Scientific Corp., Perkin-Elmer Corp., Shimadzu Scientific Instruments Inc and Varian Analytical Instruments.

The apparatus contains ambient air which is converted by the UV light (particularly the 185 nm peak) to ozone which is effective, in conjunction with the UV light, in converting hydrocarbon side groups from the polydimethylsiloxane into volatile carbon dioxide ($CO_2$) and water ($H_2O$). The removal of the identified groups leaves a silicon oxide film which is at least a 75% O—Si—O network with the remaining 25% being composed of Si—OH (14%) and Si—COOH (11%) side groups.

A seventy-five percent silicon dioxide network is substantial for such a coating at room temperature. Moreover, this degree of network is sufficient for commercial use in particular applications such as metal oxide-semiconductor field effect transistors (MOSFET) or metal-insulator-semiconductor (MIS) diodes, and generally for any device which employs very thin, high quality silicon dioxide films. Furthermore, the ultra thin films of the invention are applicable for optical material, oxygen and moisture barriers; corrosion resistant coatings; coatings on substrates used for self-assembling thin polymer or biological films; and porous membranes for ultrafiltration of biological or other small molecules (e.g., gas separation membranes), as well as the commercially significant thin film lubricant coatings for silicon nitride or silicon carbide ceramics.

One of skill in the art will appreciate the specific operating parameters of the invention from a review of the following experimental procedure and analysis of the product thereof.

EXAMPLE 1

Materials

Acid-terminated polydimethylsiloxane (diacPDMS) was prepared commercially. Vapor phase osmometry and gel permeation chromatography confirmed that the $M_n$=2100 and the polydispersity was 1.93. Endgroup titration showed that the acid functionality was exactly two. Water from a Millipore Super-Q™ water purification system was used for preparation of the LB films utilized in this example. Substrates for LB film deposition were composed of gold or silver vacuum evaporated onto glass slides.

Equipment

The LB trough used to prepare the LB films was of the constant perimeter type which is known to those skilled in the art. A UVOCS T10X10/OES UV-ozone cleaner was used for treating the deposited LB films. The apparatus contains a low pressure mercury-quartz lamp, generating UV emissions in the 185 and 254 um range (10 mW/cm$^2$). The thickness of deposited LB films was measured using a variable-angle spectroscopic ellipsometer (commercially available from J. A. Woollam Co.) capable of measuring the refractive index over a wavelength range of 2500–10000 Å. Composition and thickness of the LB films were measured using a Perkin Elmer® Physical Electronics PHI 5300 X-ray photoelectron spectrometer (XPS), equipped with a monochromatic Al Kα X-ray source (1486.6 eV) and hemispherical analyzer. Grazing-incidence infrared spectra (GIR) were measured using a Matson Cygnus 100 FTIR having an MCT detector with 4 cm$^{-1}$ resolution.

LB Film Preparation

A diacPDMS solution was prepared in chloroform (4 mg/ml). 100 μl of solution was spread onto a water subphase containing $CdCl_2$(2×10$^{-4}$) and $KHCO_3$ (2.4×10$^{-4}$M); pH=7.65, T=19° C. The floating LB film was compressed at 4 mm/min to a surface pressure of 25 mN/m where deposition took place at a vertical dipping speed of 10 mm/min. The transfer ratios for these films were all unity.

ANALYSIS

The thickness of a single monolayer of diacPDMS on a solid substrate corresponds well to a model where the PDMS chains configure as close-packed 6/1 helices standing on end. The model prediction for diacPDMS (38 Å for $M_n=2100$) agrees fairly well with film thicknesses measured by ellipsometry and XPS (29 and 28 Å, respectively). After 15 minutes of UV-ozone exposure, the film thickness decreased to 14–15 Å, representing a thickness loss of 50%.

Grazing-incidence infrared spectroscopy (GIR) was carded out on multilayer LB films of diacPDMS (t=232 Å) deposited on silver, in order to monitor the UV-ozone reaction process. FIG. 1 shows a plot of the GIR curves versus UV-ozone exposure time. The absorbance peaks of interest are those of Si—O—Si asymmetric and symmetric stretch at 1109 $cm^{-1}$ and 1063 $cm^{-1}$ respectively, and the —$CH_3$ symmetric bend at 1263 $cm^{-1}$. The appearance of the strong Si—O—Si absorbance bands indicates that the diacPDMS chains are oriented perpendicularly to the substrate surface.

As the UV-ozone exposure time increases, the —$CH_3$ absorbance bands, including the bands for asymmetric stretch at 2963 $cm^{-1}$ and rock at 824 $cm^{-1}$, all decrease. This indicates either a loss of methyl side groups or a loss of chain orientation. XPS measurements show that the C/Si ratio for unreacted diacPDMS 2/1, which is in agreement with the stoichiometric ratio for diacPDMS of 2.2/1. For UV-ozone exposed diacPDMS, after correcting for airborne carbon contamination, the C/Si ratio decreases to 0.22/1, corresponding to a 90% loss of carbon atoms.

While the magnitude of the —$CH_3$ IR absorbance bands decrease significantly during UV-ozone exposure, the Si—O—Si bands do not. However, the Si—O—Si symmetric stretch band merges with the asymmetric stretch band to give a rather featureless broad absorbance band from 1250–1050 $cm^{-1}$ typical of a quartz-like material. The frequency of the Si—O—Si asymmetric stretch bands shifts to a higher value (1142 $cm^{-1}$) after 30 min UV-ozone exposure, suggesting that the Si—O—Si packing of reacted diacPDMS is less dense than that of unreacted diacPDMS. Another interesting feature of the GIR curve for diacPDMS at the 30 min exposure time is the appearance of a large broad peak at 3700–3200 $cm^{-1}$. This is due to Si—OH stretch vibrations and is evidence for the conversion of a portion of the methyl side groups to hydroxyl groups during UV-ozone exposure.

At the end of 30 min UV-ozone exposure, there is still unreacted diacPDMS below the quartz-like layer as shown by the presence of the —$CH_3$ bending band in the GIR spectrum. Ellipsometry of this same sample shows that the thickness of unreacted diacPDMS decreases from 232 Å, to 91 Å. Defining the depth of reaction or ozone penetration as the difference between the thickness of the unreacted diacPDMS before and after UV-ozone exposure, then for this sample, the UV-ozone has penetrated to a depth of 141 Å. This distance is much smaller than the penetration limit found by Kalachev et al. for either argon (400–1000 Å) or oxygen plasma (in excess of 1000 Å). UV-ozone treatment therefore is a much more surface sensitive chemical modification technique.

Figure 2:
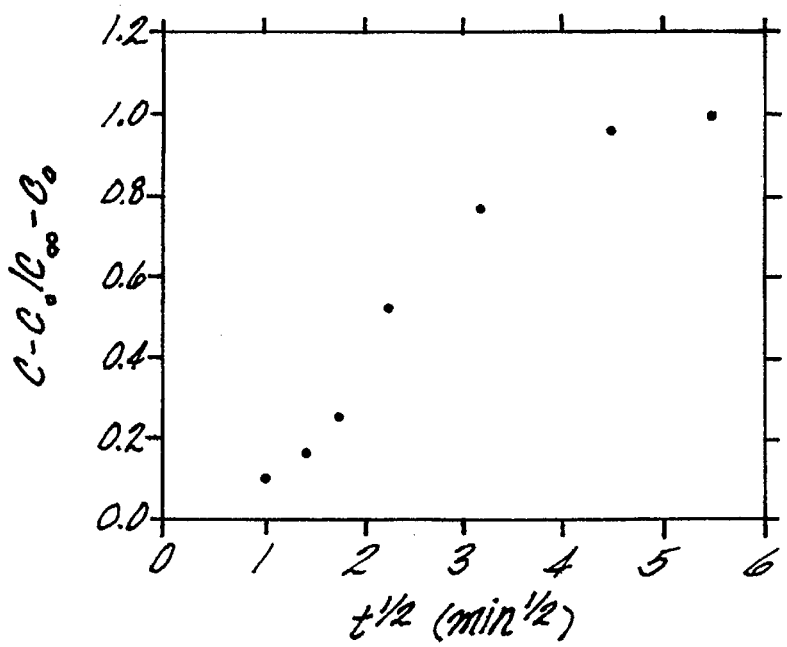
FIG. 2 is a diffusion plot of fractional loss of —$CH_3$ groups versus $t^{1/2}$ as determined by GIR. C=Abs(—$CH_3$ sym.bend)/Abs(Si—O—Si asym. stretch) at time t; $C_o$ is the normalized —$CH_3$ concentration at time t=0; $C_\infty$ is the normalized —$CH_3$ concentration at time t=30 min.

It is generally accepted that the rate limiting process for preparing thick oxide films on silicon surfaces is the diffusion of molecular oxygen into the silicon. By analogy, the kinetics of the reaction of diacPDMS with UV-ozone to form an $SiO_x$ layer is most likely limited by the diffusion rate of ozone into the LB film. To model the UV-ozone reaction as a diffusion process, the intensity for —$CH_3$ symmetric bend absorbance band, which is proportional to the concentration, is first normalized by dividing it by the Si—O—Si asymmetric stretch absorbance at each exposure time. The fractional change in —$CH_3$ concentration, given by $C-C_t/C_\infty-C_o$ (where C is the concentration at time t, $C_o$ is the concentration at t=0, and $C_\infty$ is the concentration at t=30 min) is then plotted versus $t^{1/2}$. The diffusion plot shown in FIG. 2 exhibits a distinct sigmoidal shape. A possible explanation for this behavior is as follows: at t<3 min, the generated ozone concentration is low and only the outer surface of diacPDMS reacts giving a slow reaction rate. As the generated ozone concentration increases, it diffuses into the unreacted layers below the surface and the rate of —$CH_3$ reaction increases (3<t<10 min). As more diacPDMS reacted, the buildup of a thicker $SiO_x$ layer hinders further ozone transport to the lower layers and the rate of reaction drops until at t=30 min, the ozone can no longer penetrate into the film.

To determine the composition of the UV-ozone reacted diacPDMS film, angle-resolved XPS was carded out on monolayer films deposited on gold. The binding energies found for the Si(2p), C(1s), and O(1s) core level photoelectrons from unreacted and reacted diacPDMS were compared. All of the binding energies were corrected for static charging of the samples by referencing them to the C(1s) peak arising from airborne carbon contamination at 284.6 eV. Comparison was made with the table are the literature values of the respective binding energies for PDMS and amorphous $SiO_2$. Before exposure to UV-ozone, the binding energies in diacPDMS are found to be in good agreement with the reported values for PDMS. The C(1s) signal for diacPDMS has an additional peak at 288.3 eV corresponding to the carboxylic acid endgroups. After UV-ozone exposure, curve fits of the C(1s) spectrum showed that it consists of peaks from 286.3 to 289.3 eV corresponding to —COH and —COOH chemical species which indicate incomplete oxidation of the —$CH_3$ side groups. The Si(2p) peak shifted to 103.5 eV, close to that found in amorphous $SiO_2$ (103.6 eV), which suggests that the stoichiometry of the UV-ozone exposed diacPDMS film is very nearly that of silicon dioxide.

Figure 3:
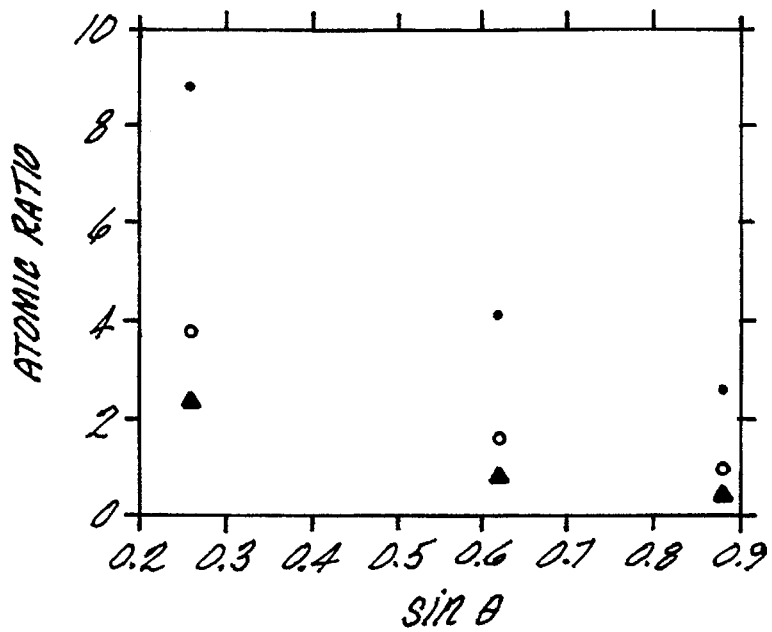
FIG. 3 is an angle-resolved XPS for a monolayer of diacid PDMS-UV-ozone exposed on gold. Plot is of O/Au (filled circles), Si/Au (open circles), and C/Au (filled triangles) atomic ratios at the takeoff angles of 15°, 38° and 62°.
Figure 4:
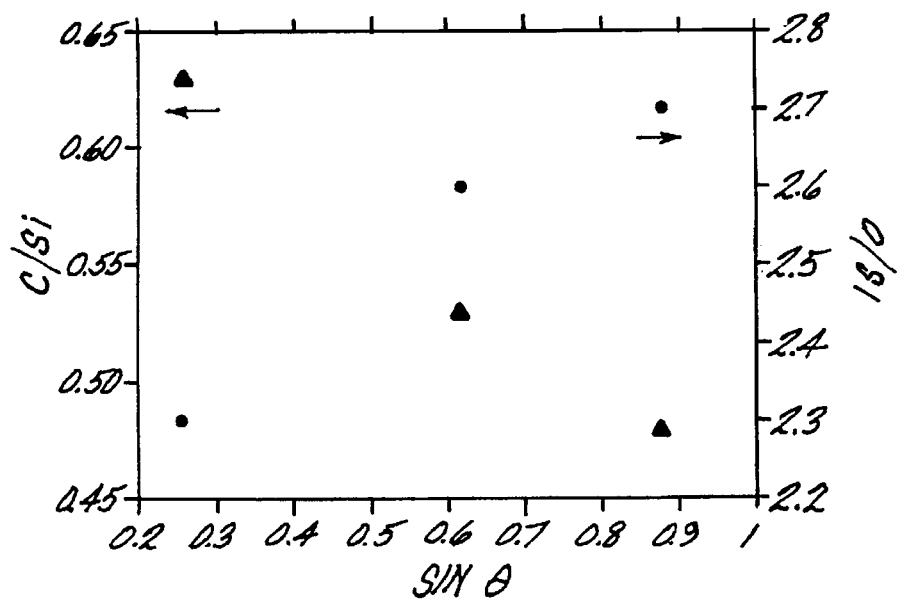
FIG. 4 is an angle-resolved XPS for a monolayer of diacPDMS-UV-ozone exposed on gold. Plot is for C/Si and O/Si atomic ratios versus at the takeoff angles of 15°, 30° and 62°.

FIG. 3 shows a plot of the atomic ratios for Si/Au, C/Au, and O/Au versus sin θ, where θ is the photoelectron takeoff angle. As shown, oxygen is the most abundant element in the film followed by silicon and carbon. The linear change in the atomic concentrations versus takeoff angle indicates that Si, C, and O were uniformly distributed throughout the film. However, the C/Si and O/Si atomic ratios as a function of the take off angle (FIG. 4), indicates that there is actually an excess of carbon on the free surface of the film and an excess of oxygen near the gold substrate interface. The excess carbon at the surface is most likely the result of airborne carbon contamination while the excess oxygen at the gold surface is associated with the partially oxidized —$CH_3$ groups as discussed hereinabove.

High resolution XPS (pass energy 8.95 eV) was carried out at a 15° takeoff angle on the UV-ozone exposed diacPDMS film to identify the components and determine the composition of the Si(2p) and O(1s) photoelectron peaks. Curve fitting of both spectra was done using 100% Gaussian curves. The best fit for Si(2p) spectra reveals two silicon peaks at the binding energies of 102.8 eV and 103.5 eV. The higher binding energy peak, accounting for 77% of the silicon, has already been identified as the Si(2p) in $SiO_2$. The lower binding energy peak is most likely due to O—Si—C groups present in the film due to the incomplete oxidation of the —$CH_3$ side groups. Using the corrected C/Si ratio (0.22/1) and assuming that all of these carbon atoms are bonded to silicon atoms, the calculated percentage of Si—C bonds for all the silicon atoms is 22%, which agrees with the Si(2p) curve fit results of 23%.

The best fit for the O(1s) peaks shows three peaks. Their binding energies and atomic percentages are as follows: 531.6 eV—11%, 532.4 eV—75%, and 533.2 eV—14%. The 532.4 eV peak is consistent with the O(1s) peak in amorphous $SiO2$ for O—Si—O groups (532.5 eV), while the peak at 531.6 eV is in the range for carbon-oxygen bonded species. The peak at 533.2 eV is possibly that for oxygen present in Si—OH groups. From GIR, it is demonstrated that a portion of the —$CH_3$ groups in diacPDMS are transformed into —OH groups during UV-ozone exposure. The higher binding energy of this O(1s) peak is due to the higher electronegativity of the bonded hydrogen atom compared to that for silicon bonded to oxygen.

From the results for Si(2p) and O(1s) curve fits it is evident that the following structure for UV-ozone exposed diacPDMS film is: from the C/Si ration of 0.22/1, and assuming no loss of silicon during UV-ozone exposure, the number of carbon atoms per chin left after exposure is approximately six. These are all composed of carbon-oxygen species. The O/Si ratio after neglecting C—O and Si—C species is found to be 2.1/1, close to that found for stoichiometric $SiO_2$ films. The slightly higher oxygen content derives from the Si—OH groups present in the film. The arrangement of atoms in an amorphous $SiO_2$ film consists of a three dimensional network where each silicon atom is bound to four oxygens and each oxygen atom is bound to two silicon atoms. From the binding energies and atomic percentages of the HRES O(1s) peak, 75% of the oxygen atoms bound to silicon are incorporated into an $SiO_2$ network structure, while 14% as Si—OH groups are not. The remaining 11% of the oxygen atoms present in the film are bonded to carbon and most likely nonbridging as well. This amount of network formation is significant given the fact that, for photoinduced transformation of polysiloxanes layers, temperatures on the order of 350°–800° C. are required to produce the final condensation reactions leading to the creation of stoichiometric $SiO_2$.

As stated hereinbefore, it has also been discovered that the method of treating thin films with UV and ozone in atmospheric pressure and at room temperature is also capable of transforming fatty acid metal soap precursor films into metal oxide films of the ultra thin variety. The films in this embodiment are treated in the same manner as for the PDMS films. Those of skill in the art will appreciate the operating parameters hereof from the following example:

EXAMPLE 2

Arachidic acid, a $C_{20}$ fatty acid, was employed as the LB film for the example and was transferred to gold and silicon substrates using cadmium as the metallic counterion. Ellipsometer measurements on multilayer LB films showed that the thickness of a single cadmium arachidate monolayer was 27–29 Å, which was in agreement with the value of 27 Å found by Gaines. Before UV-ozone exposure, XPS measurement of a 13 layer cadmium arachidate film on silicon gave a C/Cd atomic ratio of 35/1; theoretically the C/Cd ratio was calculated to be 40/1 for two $C_{20}$ chains per cadmium ion. After 30 min UV-ozone exposure, the C/Cd atomic ratio dropped to 0.94/1, which represented a carbon loss of 97%. The majority of the 3% remaining carbon could have been due to airborne carbon contamination adsorbing to the surface of the film during transfer of the film sample to the XPS for measurement. For example, typically 2–3% adventitious carbon was found on most sample surfaces just from exposure of an XPS sample to air. If the amount was present on the surface of a 13 layer UV-ozoned cadmium arachidate film, the C/Cd atomic ratio would be 0.56.

The binding energy of the $Cd_{3d5/2}$ photoelectron in the cadmium arachidate film before UV-ozone exposure was found to be 405.2 eV; after exposure the binding energy was observed to be relatively unchanged at 405.3 eV. The reason for this could be due to the fact that the binding energy observed for cadmium in the arachidic acid films was that of the cadmium carboxylate salt. Therefore this increased the binding energy for cadmium from 405 to 405.2 eV. After UV-ozone exposure, cadmium monoxide forms (CdO) which also has a binding energy of 405.2 eV. It is further concluded that cadmium dioxide was not formed during UV-ozone exposure of the cadmium arachidate film because the binding energy for $CdO_2$ was located at 403.6 eV.

Figure 5:
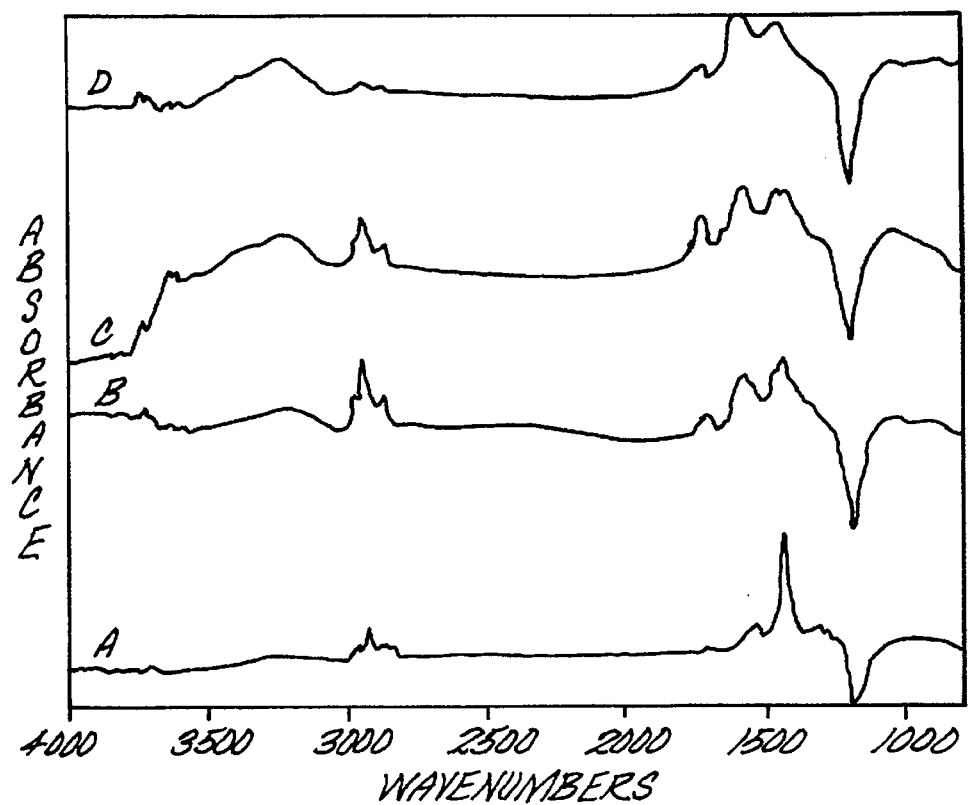
FIG. 5 is a GIR spectra vs. UV-ozone exposure time for a cadmium arachidate film on gold (t=243 Å) for A—zero min, B—5 min, C—10 min, D—15 min. Each spectrum was obtained at an average of 100 scans, the reflection angle of 80°.

FIG. 5 shows the GIR curves versus UV-ozone exposure time for a cadmium arachidate film on gold (t=243 Å). At zero exposure time, the main peaks present in the cadmium arachidate GIR spectrum were the —$CO_2$ symmetric and asymmetric stretches at 1433 $cm^{-1}$ and 1549 $cm^{-1}$ respectively; the —$CH_2$ symmetric and asymmetric stretches at 2851 $cm^{-1}$ and 2918 $cm^{-1}$ respectively; and the —$CH_3$ symmetric and asymmetric stretches at 2874 $cm^{-1}$ and 2961 $cm^{-1}$ respectively. After 5 min UV-ozone exposure, the peak for —$CO_2$ decreased and the intensity of the methyl and methylene peaks increased, which indicated increased alignment of the arachidic acid molecules with the normal component of the reflected IR beam. This was similar to the behavior found by Kalachev et al. for oxygen plasma treated cadmium arachidate LB films. After 15 min exposure time, most of the carbon atoms had been completely eliminated leaving only cadmium monoxide on the gold surface.

Table 1 shows the effect of film thickness and UV-ozone exposure time on the etch rate of the cadmium arachidate films, where the etch rate was defined as the film thickness before exposure minus the film thickness after exposure divided by the exposure time. For UV-ozone exposure times on the order of a few minutes, the etch rate was found to be fairly low at 8 Å/min. At longer times (10 min), the etch rate increased to 53 Å/min, which for cadmium arachidate was about 2 monolayers/min.

Figure 6:
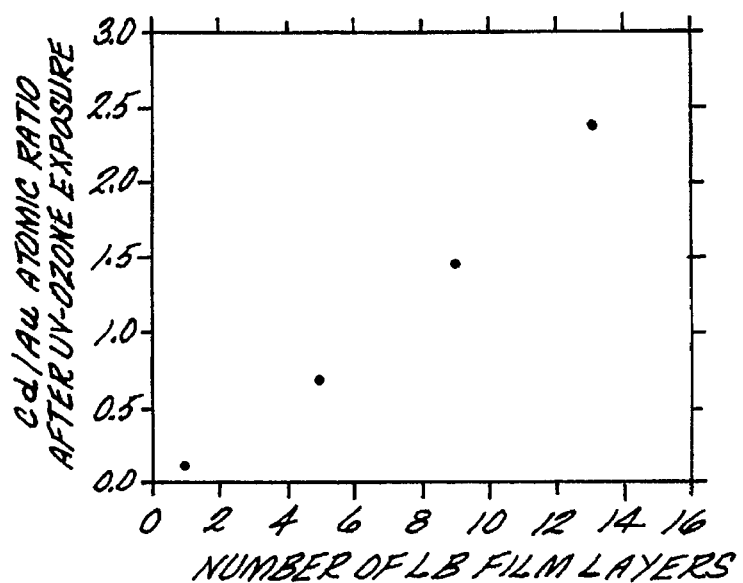
FIG. 6. Surface loading of CdO on gold by UV-ozone exposure of cadmium arachidate LB films, as determined by XPS.

FIG. 6 shows that the loading of CdO on the surface of a gold substrate can be accomplished simply by increasing the number of deposited cadmium arachidate layers prior to UV-ozone exposure. As the number of layers increased from 1 to 13, the Cd/Au atomic ratio increased linearly, after UV-ozone exposure. An estimate of the CdO layer thickness formed from UV-ozone exposure of five and thirteen deposited cadmium arachidate layers was determined by XPS. Using a silicon substrate and assuming a photoelectron mean free path for Si(2p) in CdO of ~20 Å, the thicknesses were calculated to be 7 and 14 Å respectively. These values are most likely too high considering that a single monolayer of cadmium arachidate after UV-ozone exposure only leaves enough CdO to cover ~14% of the substrate area (assuming one $Cd^2$ per two arachidic acid chains, and a covalent radius for a cadmium ion of 1.41 Å). At least 7 layers would be needed to give a complete monolayer cover of cadmium oxide. Five cadmium arachidate layers would give 70% coverage, while thirteen layers would give one monolayer plus a second monolayer covering of 86%.

Figure 7:
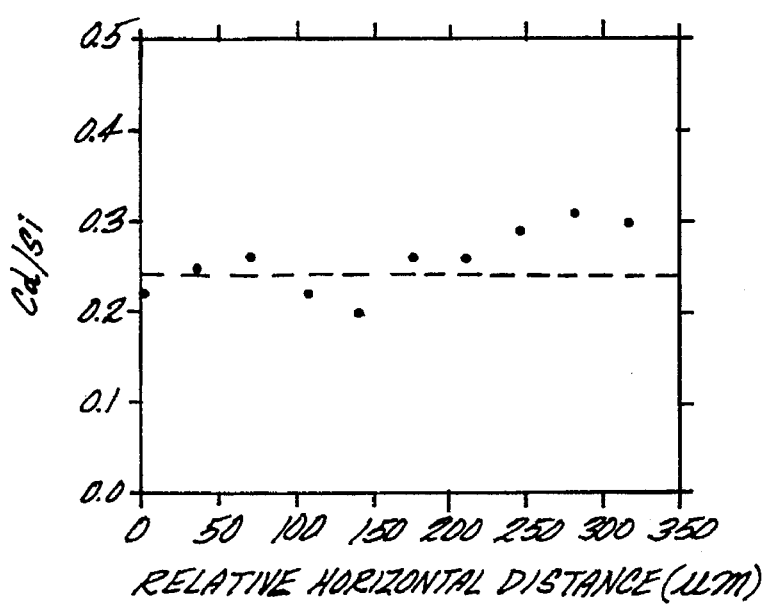
FIG. 7. Scanning Auger measurement of Cd/Si atomic ratio versus horizontal distance along a CdO coated silicon sample. Starting point for measurement was in the center of a 1 cm wide sample, and spot size for the beam was 1 μm.

Scanning Auger of the surface of a cadmium oxide coated silicon sample (built up from five cadmium arachidate layers) was carried out to measure the uniformity of the metal oxide coating. FIG. 7 shows a plot of the Cd/Si atomic ratio versus the relative horizontal distance along the sample. The Auger x-ray beam had a spot size of approximately 1 µm in diameter and was positioned near the center of the sample at the start of the scan. After collecting a spectra, the beam was moved horizontally by a distance of 35 μm for the next scan. The $Cd_{LMM}$ and $Si_{LMM}$ Auger peaks at 378 and 89 eV were used to calculate the Cd/Si atomic ratios. The dashed line in FIG. 7 corresponds to the Cd/Si atomic ratio calculated from XPS. The Auger data was in good agreement with the XPS data and the concentration of CdO on the surface of the silicon appeared to be fairly uniform. Profilometer scans (400 μm length) of silicon surfaces that had five LB film layers of cadmium arachidate and manganese arachidate exposed to UV-ozone showed that the centerline roughness increased from 25±3 Å for the bare silicon surface to 45 Å and 48±3 Å respectively for the metal oxide coated silicon surfaces.

Alternate embodiments of the above involve mixing functionally-terminated hydrocarbon chain oligomers with the α,ω-functional polysiloxanes as discussed hereinabove. The hydrocarbon oligomers function to create islands within the polysiloxane matrix or vice versa. Thereafter, treatment in the method of the invention creates a porosity in the $SiO_2$ coating, the degree of which is adjustable by the amount of hydrocarbon oligomer added. Adjustability extends from a minimally porous $SiO_2$ coating to islands of $SiO_2$ in a large matrix of space on the surface of the substrate, the larger constituent (hydrocarbon oligomer) having been completely removed.

Ultra thin $SiO_x$, metal oxide and organo-ceramic films are also valuable in the construction of microelectronic and photonic devices that require such insulators and dysed semi-conductors. Since these films are of tunneling dimensions, their applications in MOS and MIS devices including MIS tunnel diodes, insulated-gate field-effect transistors, EEPROMS and MOS injection lasers are anticipated.

Organo-ceramic surfaces to serve as oxygen and moisture barriers can be formed on the surface of temperature sensitive polymers. One of a variety of organo-silicone copolymers or functional siloxanes is added to the polymer matrix and segregates preferentially to the surface. When exposed to the aforementioned UV/ozone process, the surface layer of polysiloxane is converted to the ograno-ceramic at more temperature. Similar surface layers may be formed by directly depositing functional silicones (e.g., by self assembly) onto polymeric or other temperature sensitive substrates.

Metal ions may also be incorporated into the carboxylic acid-terminated polysiloxane material thus altering the properties of the resulting film. Choice of metal ions and amount thereof have differing properties to lend to the film.

Referring now to the ultra thin metal oxide films, the process of the invention is also particularly adapted to production of these from fatty acid LB films. As will be appreciated by those of skill in the art, ultra thin metal oxide films are commercially valuable as anti-reflective coating materials for optical components, such as lenses, etc. The films are also valuable as lubricants for metal or ceramic surfaces.

TABLE 1

UV-ozone etch rate of cadmium arachidate LB films as measured by ellipsometry.

| Initial Film Thickness (Å) | UV-ozone Exposure Time (min) | Etch Rate (Å/min)* |
| --- | --- | --- |
| 190 | 3 | 8 |
| 240 | 5 | 16 |
| 1420 | 10 | 53 |
|  | 10 | 34 |

*etch rate = [$t_{initial} - t_{final}$/exposure time]

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for producing ultra thin film silicon oxide comprising the steps of:
   a) preparing a preceramic siloxane containing thin film; and
   b) exposing said film to ultraviolet light and ozone for a period of time sufficient to oxidize hydrocarbon groups and create bridging oxygen groups within said film.

2. A method for producing ultra thin film silicon oxide as claimed in claim 1 wherein said siloxane containing film is a polysiloxane.

3. A method for producing ultra thin film silicon oxide as claimed in claim 2 wherein said polysiloxane is α,ω-functional polydimethylsiloxane.

4. A method for producing ultra thin film silicon oxide as claimed in claim 1 wherein the step of preparing includes:
   a) dissolving an α,ω-functional polysiloxane in a volatile solvent;
   b) adding a sufficient amount of the dissolved elements to the surface of the water in a trough said addition being conducted dropwise;
   c) evaporating the solvent;
   d) compressing a polysiloxane coating left on the water after evaporation of the solvent; and
   e) passing a vertical substrate through the monolayer water interface.

5. A method for producing ultra thin film silicon oxide as claimed in claim 1 wherein the step of preparing includes:
   a) blending polysiloxanes with an effective amount of one or more of the group consisting of polymers and block copolymers of siloxanes; and
   b) spin-coating.

6. A method for producing ultra thin film silicon oxide as claimed in claim 1 wherein the step of preparing includes:
   a) blending polysiloxanes with an effective amount of one or more of the group consisting of polymers and block copolymers of siloxanes; and
   b) spray coating.

7. A method for producing ultra thin film silicon oxide as claimed in claim 1 wherein the step of preparing includes:
   a) blending polysiloxanes with an effective amount of one or more oft he group consisting of polymers and block copolymers of siloxanes; and
   b) dip coating.

8. A method for producing ultra thin film silicon oxide as claimed in claim 1 wherein the step of preparing includes:

a) blending polysiloxanes with an effective amount of one or more of the group consisting of polymers and block copolymers of siloxanes; and b) flow coating.

9. A method for producing ultra thin film silicon oxide as claimed in claim 1 wherein said ultraviolet light is in the range of from 185 nm to 254 nm.

10. A method for producing ultra thin film silicon oxide as claimed in claim 1 wherein said UV light includes at least two peak eV energies at about 185 nm and about 254 nm.

11. A method for producing ultra thin film silicon oxide as claimed in claim 1 wherein said ozone is supplied by pre-creating the same and dispersing said ozone in the vicinity of the film.

12. A method for producing ultra thin film silicon oxide as claimed in claim 1 wherein said ozone is created as a reaction product between ambient air and the UV light.

13. A method for producing ultra thin film silicon oxide as claimed in claim 1 wherein said exposing step is for the period of about 5 to about 30 minutes.

14. A method for producing ultra thin film silicon oxide as claimed in claim 1 wherein said exposing step is carded out at about atmospheric pressure and at about room temperature.

15. A method for producing ultra thin film silicon oxide as claimed in claim 1 wherein said hydrocarbon groups and bridging oxygen groups are oxidized to $CO_2$ and $H_2O$ by the exposing step, simultaneously producing bridging oxygen species.

16. A method for producing ultra thin film silicon oxide as claimed in claim 12 wherein said $CO_2$ and $H_2O$ are vaporized and said siloxane containing film is thereby converted to an ultra thin layer of about 75% $SiO_2$.

* * * * *